United States Patent [19]
Herkstroeter

[11] Patent Number: 4,933,948
[45] Date of Patent: Jun. 12, 1990

[54] DYE LASER SOLUTIONS

[75] Inventor: William G. Herkstroeter, Webster, N.Y.

[73] Assignee: Eastman Kodak Company, Rochester, N.Y.

[21] Appl. No.: 358,929

[22] Filed: May 30, 1989

[51] Int. Cl.$^5$ .................. H01S 3/20; C09B 67/00; C09B 67/46; C09K 11/06
[52] U.S. Cl. .......................... 372/53; 8/561; 8/648; 252/301.17
[58] Field of Search ............ 8/561, 408, 648; 252/301.17; 372/53

[56] References Cited

U.S. PATENT DOCUMENTS

| | | | |
|---|---|---|---|
| 4,724,201 | 2/1988 | Okazaki et al. | 430/570 |
| 4,731,793 | 3/1988 | Ukai et al. | 252/301.17 |
| 4,808,189 | 2/1989 | Oishi et al. | 8/408 |
| 4,839,269 | 1/1989 | Okazaki et al. | |

FOREIGN PATENT DOCUMENTS 2100557  5/1987  Japan .................... 8/561

OTHER PUBLICATIONS

Abstract: CA111(12): 105245x, Politzer et al., 1989.
Abstract: CA107(16): 144715n, Ermanji et al., 1987.
Abstract: CA103(8): 62125y, Tomaru et al., 1984.
Abstract: CA101(4): 30990u, Jones et al., 1983.
Abstract are from Chemical Abstracts of the American Chemical Society.
Kobayashi et al., *J. of Polymer Science:* Part C, Polymer Letters Edition, vol. 27, pp. 191–195 (May 1989).
Degani et al., Chemical Physics Letters, vol. 104, No. 5, "Lasing of Rhodamine B in Aqueous Solutions Containing β-Cyclodextrin", Feb. 17, 1984, pp. 496–499.
Agbaria et al., J. Phys. Chem., 92, 1988, pp. 1052–1055.
Programs and Abstracts of the 17th Northeast Regional Meeting of the American Chemical Society, Rochester, N.Y., Nov. 8–11, 1987, Abstract No. 348.

*Primary Examiner*—A. Lionel Clingman
*Assistant Examiner*—Jeff E. Darland
*Attorney, Agent, or Firm*—Robert A. Linn

[57] ABSTRACT

Aqueous solutions useful in dye lasers contain a substituted cyclodextrin-fluorescent dye inclusion compound, and an excess of the cyclodextrin. Such solutions give greater fluorescent yields than similar inclusion compounds made from non-substituted cyclodextrins.

13 Claims, No Drawings

DYE LASER SOLUTIONS

FIELD OF THE INVENTION

This invention relates to aqueous dye solutions useful in dye lasers. More particularly, it relates to aqueous solutions of inclusion compounds formed by a cyclodextrin and a fluorescent dye. The cyclodextrins employed are substituted $\alpha$ and $\beta$ cyclodextrins.

In a particular aspect, this invention relates to the discovery that substituted cyclodextrin dye inclusion compounds give greater fluorescent yields than similar compounds formed from non-substituted cyclodextrins.

BACKGROUND OF THE INVENTION

A laser is a light amplifying apparatus which produces coherent monochromatic light with excellent directivity. Dye lasers are a class of liquid lasers. They have an optical resonator comprising a transparent cell which contains a solution of a laser active dye. They also comprise a pumping energy source optically coupled to the cell. During laser operation, the dye solution can be circulated through a circulation system which includes the cell.

Typical energy pumping sources emit high energy electrons or light. Discharge tubes, flash lamps, liquid lasers, gas lasers, and solid lasers can be used as energy pumping units. As a result of their action, the dye molecules in the dye lasers are excited to higher energy states causing radiant energy transformation. The light produced, which travels along the axis of the resonator, is confined within the resonator for a sufficient period of time to strongly interact with the excited dye molecules. When the number of excited dye molecules exceeds the number of molecules in the ground state, induction emission occurs, and the light is amplified within the resonator to emit laser light.

One of the major advantages of the dye laser over solid and gas lasers is its tunability with respect to output wavelengths; that is, although the laser active dye has a certain range of fluorescent band, its output wavelengths are accurately controlled with the aid of a suitable device, such as a prism or a diffraction grating.

Laser dyes are commonly employed in alcoholic solutions, even though the thermal properties of water are superior to those of any alcohol. Specifically, the variation of the refractive index of water is smaller than that of ethanol. This characteristic is particularly important for the development of high-power lasers and for continuous wave lasers.

Aqueous dye solutions have usually not been used in dye lasers because of low dye solubility and the formation of dye dimers and higher aggregates. It is most common for dye dimers and aggregates to form in the H-configuration; such dimers and aggregates usually show greatly diminished fluorescence quantum yields which are incompatible with effective lasing. Even for those cases where dye aggregation does not decrease fluorescence, there are spectral shifts between dye monomers and dye aggregate to contend with. Apparently for these reasons, Applicant is unaware of any practical applications involving dye dimers or higher aggregates in dye lasers. Thus, a need exists for dye laser aqueous systems which have enhanced dye solubility and which combat dye dimerization and higher aggregation. This invention satisfies those needs.

As part of this invention, it has been shown that the presence of a substituted cyclodextrin increases the water solubility of lasing dyes. The greater solubility apparently assists in increasing the fluorescence level, thereby making the system meet the criteria necessary for effective lasing. This ability of substitution on the cyclodextrin ring to increase the fluorescence level is unknown in the art.

As explained more fully below, this invention comprises the use of substituted cyclodextrins to combat dye aggregation. The synthesis of chemically modified cyclodextrins is extensively discussed in *Tetrahedron* 37, No. 9, pp. 1417-1474 (1983). As stated therein, cyclodextrins are cyclic oligosaccharides consisting of at least six glucopyranose units which are joined together by $\alpha(1\rightarrow 4)$ linkages. Although cyclodextrins with up to 12 glucose residues are known, only the first three homologs, i.e., those having 6, 7, or 8 glucose units, have been studied extensively. The oligosaccharide ring forms a torus, i.e., a truncated hollow cone, with the primary hydroxyl groups of the glucose residues lying on the narrow end of the torus. The secondary glucopyranose hydroxyl groups are located on the wider end.

The initial discovery of cyclodextrins is attributed to Villiers, who isolated them as degradation products of starch. In 1904, Schardinger demonstrated that these compounds could be obtained by the action of Bacillus macerans amylase upon starch.

RELATED ART

Degani et al, *Chemical Physics Letters Vol.* 104, No. 5, 17 Feb. 1984, discusses laser dyes, the use of alcohol and aqueous systems, and the problem caused by dye aggregation in water. According to the authors, this difficulty has been dealt with in the past by adding detergents or using solvent mixtures, leading in fact to laser action from such modified solutions. The concentrations of the additives are often in the range of 4-25%, high enough to adversely affect the superior thermal properties of the aqueous media.

The authors reported that addition of $\beta$-cyclodextrin to aqueous solutions of rhodamine B results in the deaggregation of the dye to its monomer form. The deaggregation was attributed to association of the monomeric rhodamine B to the cyclodextrin.

Agbaria et al, *J. Phys. Chem.*, 1988, 92, 1052-1055 discloses emulsion complexes of 2,5-diphenyloxazole, a laser dye, and unsubstituted cyclodextrins.

The Programs and Abstracts of the 17th Northeast Regional Meeting of the American Chemical Society, Rochester, N.Y., Nov. 8-11, 1987, includes Abstract No. 348 entitled "Inclusion by Cyclodextrins to Control Dye Aggregation Equilibria in Aqueous Solution," a paper given by Applicant and two coworkers, S. Farid and P. A. Martic. The paper reported that unsubstituted cyclodextrins form inclusion compounds with oxazine dyes, thereby controllably providing highly fluorescent monomeric forms.

The references make no suggestion that better fluorescence yields can be obtained by use of substituted cyclodextrins. Hence, applicant's discovery of the enhanced effect of substituted cyclodextrins is a substantial advance in the state of the art.

SUMMARY OF THE INVENTION

This invention relates to the discovery that inclusion compounds of a fluorescent dye and a substituted cyclodextrin have a greater ability to overcome the problems of dye aggregation in aqueous systems than analogous compounds prepared from unsubstituted cyclodextrins. Stated another way, this invention comprises the discovery that improvement in relative fluorescent yield is greater, when a fluorescent dye is bonded to a substituted cyclodextrin than to an unsubstituted cyclodextrin. Thus, this invention provides a new type of aqueous fluorescent dye system for use with dye lasers. More particularly, this invention provides aqueous dye systems which comprise a substituted cyclodextrin. Thus, this invention provides a means for enhancing the fluorescent yield from aqueous fluorescent dyes; viz, the incorporation of a substituted cyclodextrin in the aqueous system. This invention also provides improved dye lasers, i.e., lasers comprising the improved aqueous solutions of the invention.

The cyclodextrins used in this invention have an internal cavity that is not so large that it can incorporate two or more dye molecules. Substituted $\beta$-cyclodextrins and, in some instances, substituted $\alpha$-cyclodextrins can be used. The latter can be used when the dye molecule fits within the $\alpha$-cyclodextrin.

As discussed more fully below, this invention comprises use of cyclodextrins substituted by a hydrophobic group such as an alkyl group. There is no indication in the literature that the incorporation of such groups would improve the ability of the cyclodextrin to combat dye aggregation. Hence, the beneficial results obtained by this invention are entirely unexpected.

DESCRIPTION OF PREFERRED EMBODIMENTS

This invention provides as a composition of matter, a cyclodextrin inclusion compound of a fluorescent dye, and an $\alpha$- or $\beta$-cyclodextrin having an organic substituent bonded to an oxygen atom in a ring glucose unit in said cyclodextrin. In said inclusion compound, there is one dye molecule within each substituted cyclodextrin ring.

This invention also provides as a composition of matter, an aqueous system suitable for use in a dye laser, said system comprising (i) water, (ii) a cyclodextrin inclusion compound of a fluorescent dye wherein the cyclodextrin is a substituted cyclodextrin having an organic substituent bonded to a ring glucose unit, and (iii) ring-substituted cyclodextrin not combined with dye, such that the relative concentration of the non-dye combined substituted cyclodextrin in the aqueous medium is substantially higher than the concentration of the dextrin cyclodextrin inclusion compound. In a preferred embodiment, there is present in the aqueous medium at least about 1000 times more non-dye combined substituted cyclodextrin (S-CD) than substituted cyclodextrin dye inclusion compound (S-CDDIC). Stated another way, the value of the ratio:

$$\frac{\text{moles (S-CD)}}{\text{moles (S-CDDIC)}} \quad (I)$$

is at least equal to about 100, and is preferably equal to about 1000. For this calculation, one can assume that the concentration of (S-CDDIC) is equal to the concentration of dye added to the medium, and the concentration of substituted cyclodextrin not bonded in a dye inclusion compound is equal to the concentration of S-CD added to the water to prepare the dye solution. By way of illustration, in the examples it is stated that solutions were prepared wherein the dye concentration is typically $1 \times 10^{-5}$M, and the concentration of the substituted cyclodextrin used was 0.02M. In such an instance, the above ratio is calculated as follows:

$$\frac{0.02}{0.00001} = 2000$$

It will be recognized that the above calculation is an approximation. However, it is accurate enough for use in this invention. In this regard, it is pointed out that better fluorescent yields are obtained when the concentration of substituted cyclodextrin is significantly greater than the concentration of the dye. Without being bound by any theory, it is believed that there is an equilibrium between dye within the inclusion compound and dye not within such compounds, and that an excess of the substituted cyclodextrin favors formation of the inclusion compound.

It is within the skill of the art for a practitioner, familiar with this invention, to formulate an aqueous system within the scope of the invention by preparing a series of solutions having a constant dye concentration and a varying concentration of substituted cyclodextrin, and to measure the intensity of fluorescence yield of each solution, and thereby determine what relative concentration of dye and cyclodextrin is desirable. Thus, the suggested value range of ratio (I) above is a guide to defining solutions of this invention, but routine experimentation of the type suggested above may indicate that certain solutions within this invention have a relative concentration ratio outside the suggested range.

The substituted cyclodextrins employed in this invention are preferably selected from several types of compounds. First, it is preferred that the cyclodextrin be an $\alpha$- or $\beta$-cyclodextrin, i.e., that it have six or seven glucose units in the ring. More preferably, the substituted cyclodextrin is a beta cyclodextrin, i.e., it has seven glucopyranose units in the ring. The substituted alpha dextrins can be used when the dye molecules are of a sufficient size to fit within the cavity formed by the ring of glucopyranose units. Second, it is preferred that the substituent or substituents in the cyclodextrin molecules be bonded to an oxygen atom in a ring glucose unit. It is also preferred that when the cyclodextrin has two or more substituents per molecule, the substituents be the same. Such compounds are preferred because they are more generally available; however, it is to be understood that this invention is not limited to their use.

Each glucose unit may have a substituent; however, it is not necessary that the cyclodextrin be that heavily substituted. In other words, not all of the ring glucose units need to be substituted. For this invention, it is only necessary that on average, each cyclodextrin molecule has one substituent per dextrin ring. The substituents may be in one or more of the 2-, 3-, or 6-positions in the glucopyranose rings.

The cyclodextrin rings may be composed of glucose units (sometimes referred to herein as glucopyranose units) having up to three substituents. Again, it is not necessary that the units be that heavily substituted. Hence, it is preferred that the number of substituents per glucose unit be within the range of from about 0.5 to about 2.0. It is to be understood that the invention extends to the use of cyclodextrins somewhat outside this range. Thus, for example, one may use hexakis and heptakis tri-substituted compounds; i.e., $\alpha$- and $\beta$-cyclodextrins having three substituents per glucose unit.

Compounds of the types discussed above have preferred types of substituents. One preferred type of substituent is an alkyl radical. Of the alkyl radicals, those having up to about six carbon atoms are preferred. The methyl group is a highly preferred substituent, especially when two or more substituents are on one glucose unit in the dextrin ring.

A second preferred type of substituent has the formula —(CH—CHR$^1$—O—)$_n$—H wherein R$^1$ is selected from the class consisting of hydrogen and alkyl groups having up to about six carbon atoms. In the above formula, n is a small whole number having a value up to about six; preferably, n is equal to 1. Preferred substituents of this type are hydroxyethyl and hydroxypropyl.

A third type of substituent on the cyclodextrin is a bridging group that links two cyclodextrin moieties. These bridging groups have the formula —CHR$^1$—CHOH—CHR$^1$— wherein R$^1$ has the same significance as above. In these polymeric cyclodextrins, the number of cyclodextrin rings so bridged is from two to about six. In other words, there can be two cyclodextrin rings linked by the bridging group, or there can be three of the rings linked by two bridging groups, and so on, such that there can be six rings linked by five bridging groups. It is to be understood that higher polymers can be used in the invention if they have properties analogous to the polymers within the range given above, and the increased size or molecular weight does not confer an undesirable property to the extent that it makes the material unsuitable for use in the invention.

The polymeric cyclodextrins may have substituents in addition to the group that links or bridges two cyclodextrin moieties. For example, the cyclodextrin moieties may have one or more carboxyalkyl (—R—COOH) substituents, wherein R is a lower alkylene radical having up to about 4 carbon atoms. Preferably such a substituent is carboxymethyl; —CH$_2$—COOH. Preferably, there are two carboxymethyl groups per cyclodextrin ring.

In a preferred embodiment, the dye and the substituted cyclodextrin are added to water at or about their limit of solubility. Although one can employ more dilute systems, concentrated materials generally give better results. In general, the dyes are much less soluble than the substituted cyclodextrins. It has also been observed that the substituted cyclodextrins used in this invention quite often have greater water solubility than unsubstituted cyclodextrins. In a preferred embodiment, the substituted materials have an enhanced water solubility compared to the unsubstituted materials.

This invention is not limited to the use of any particular class of fluorescent dyes. In other words, the dye from which the inclusion compound is made can be selected from a wide range of materials. Of the fluorescent dyes, the following types can be mentioned.

One preferred class of fluorescent dyes are fluorescent coumarin dyes. Among specifically preferred fluorescent coumarin dyes are those satisfying formula I:

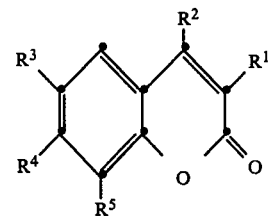

where
R$^1$ is chosen from the group consisting of hydrogen, carboxy, alkanoyl, alkoxycarbonyl, cyano, aryl, and a heterocylic aromatic group,
R$^2$ is chosen from the group consisting of hydrogen, alkyl, haloalkyl, carboxy, alkanoyl, and alkoxycarbonyl,
R$^3$ is chosen from the group consisting of hydrogen and alkyl,
R$^4$ is an amino group, and
R$^5$ is hydrogen, or
R$^1$ and R$^2$ together form a fused carbocyclic ring, and/or
the amino group forming R$^5$ completes with at least one of R$^4$ and R$^6$ a fused ring.

The alkyl moieties in each instance contain from 1 to 5 carbon atoms, preferably 1 to 3 carbon atoms. The aryl moieties are preferably phenyl groups. The fused carbocyclic rings are preferably five, six, or seven membered rings. The heterocyclic aromatic groups contain 5 or 6 membered heterocyclic rings containing carbon atoms and one or two heteroatoms chosen from the group consisting of oxygen, sulfur, and nitrogen. The amino group can be a primary, secondary, or tertiary amino group. When the amino nitrogen completes a fused ring with an adjacent substituent, the ring is preferably a five or six membered ring. For example, R$^5$ can take the form of a pyran ring when the nitrogen atom forms a single ring with one adjacent substituent (R$^3$ or R$^5$) or a julolidine ring (including the fused benzo ring of the coumarin) when the nitrogen atom forms rings with both adjacent substituents R$^3$ and R$^5$.

The following are illustrative fluorescent coumarin dyes known to be useful as laser dyes:

| | |
|---|---|
| FD 1 | 7-Diethylamino-4-methylcoumarin |
| FD 2 | 4,6-Dimethyl-7-ethylaminocoumarin |
| FD 3 | 4-Methylumbelliferone |
| FD 4 | 3-(2-Benzothiazolyl)-7-diethylaminocoumarin |
| FD 5 | 3-(2'-Benzimidazolyl)-7-N,N-diethylamino coumarin |
| FD 6 | 7-Amino-3-phenylcoumarin |
| FD 7 | 3-(2'-N-Methylbenzimidazolyl)-7-N,Ndiethyl-aminocoumarin |
| FD 8 | 7-Diethylamino-'-4-trifluoromethylcoumarin |
| FD 9 | 2,3,5,6- lH'-4H-Tetrahydro-8-methylquinola zino[9,9a,1 -gh]coumarin |
| FD 10 | Cyclopenta[c]Julolindino[9,10 3]llH-pyran 11 one |
| FD 11 | 7-Amino-4-methylcoumarin |
| FD 12 | 7-Dimethylaminocyclopenta[c]coumarin |
| FD 13 | 7-Amino-4-trifluoromethylcoumarin |
| FD 14 | 7-Dimethylamino-4-trifluoromethylcoumarin |
| FD 15 | 1,2,4,5,3H,6H,10H-Tetrahydro-8-trifluoro methyl[1]benzopyrano[9,9a,1 gh]quinolizin 10 one |
| FD 16 | 4-Methyl-7-(sulfomethylamino)coumarin sodium salt |
| FD 17 | 7-Ethylamino-6-methyl-trifluoromethylcoumarin |
| FD 18 | 7-Dimethylamino-4-methylcoumarin |
| FD 19 | 1,2,4,5,3H,6H,10H-Tetrahydro-carbethoxy |

| | -continued |
|---|---|
| FD 20 | [1]benzopyrano[9,9a,1 gh]quinolizino-10-one 9-cetyl-1,2,4,5,3H,6H,10H-tetrahydro[1] benzopyrano[9.9a.1 h]quinolizino-10-one |
| FD 21 | 9-Cyano-1,2,4,5,3H,6H,10H-tetrahydro[1] benzopyrano[9,9a,1 h]quinolizino-10-one |
| FD 22 | 9-(Butoxycarbonyl)-1,2,4,5,3H,6H,10H tetrahyro[1]benzopyrano[9,9a,1 gh]quino lizino-10-one |
| FD 23 | 4-MethylPiPeridino[3.2 g]coumarin |
| FD 24 | 4-Trifluoromethylpiperidino[3.2 ]coumarin |
| FD 25 | 9-Carboxy-1,2,4,5,3H,6H,10H-tetrahydro1] benzopyrano9.9a[40 -1 h]quinolizino-10-one |
| FD 26 | N-Ethyl-4-trifluoromethylpiperidino[3,2 ] coumarin |

Another preferred class of fluorescent dyes are fluorescent 4-dicyanomethylene-4H-pyrans and 4-dicyanomethylene-4H-thiopyrans, hereinafter referred to as fluorescent dicyanomethylenepyran and thiopyran dyes. Preferred fluorescent dyes of this class are those satisfying formula (II):

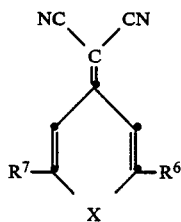

wherein
X represents oxygen or sulfur;
R⁶ represents a 2-(4-aminostyryl) group; and
R⁷ represents a second R⁶ group, an alkyl group, or an aryl group.

Although X most conveniently represents oxygen or sulfur, it is appreciated that higher atomic number chalcogens should provide similar, though bathochromically shifted, response. The amino group can be a primary, secondary, or tertiary amino group. In one specifically preferred form the amino group can form at least one additional fused ring with the styryl phenyl ring. For example, the styryl phenyl ring and the amino group can together form a julolidine ring or the amino group can form an five or six membered ring fused with the styryl phenyl ring. The alkyl group forming R⁶ typically contains from 1 to 5 carbon atoms, preferably 1 to 3 carbon atoms. The aryl group forming R⁶ is preferably phenyl. When both R⁶ and R⁷ form a 2-(4-aminostyryl) group, the groups can be the same or different, but symmetrical compounds are more conveniently synthesized.

The following are illustrative fluorescent dicyanomethylenepyran and thiopyran dyes:

| FD-27 | 4-(Dicyanomethylene)-2-methyl-6-(p-dimethylaminostyryl)-4H-pyran |
|---|---|
| FD-28 | 4-(Dicyanomethylene)-2-methyl-6-[2-(9-julolidyl)ethenyl]-4H-pyran |
| FD-29 | 4-(Dicyanomethylene)-2-phenyl-6-[2-(9-julolidyl)ethenyl]-4H-pyran |
| FD-30 | 4-(Dicyanomethylene)2,6-[2-(9-julolidyl)ethenyl]-4H-pyran |
| FD-31 | 4-(Dicyanomethylene)-2-methyl-6-[2-(9-julolidyl)ethenyl]-4H-thiopyran |

Useful fluorescent dyes can also be selected from among known polymethine dyes, which include the cyanines, merocyanines, complex cyanines and merocyanines (i.e., tri-, tetra- and poly-nuclear cyanines and merocyanines), oxonols, hemioxonols, styryls, merostyryls, and streptocyanines.

The cyanine dyes include, joined by a methine linkage, two basic heterocyclic nuclei, such as azolium or azinium nuclei, for example, those derived from pyridinium, quinolinium, isoquinolinium, oxazolium, thiazolium, selenazolium, indazolium, pyrazolium, pyrrolium, indolium, 3H-indolium, imidazolium, oxadiazolium, thiadioxazolium, benzoxazolium, benzothiazolium, benzoselenzolium, benzotellurazolium, benzimidazolium, 3H- or 1H-benzoindolium, naphthoxazolium, naphthothiazolium, naphthoselenazolium, naphthotellurazolium, carbazolium, pyrrolopyridinium, phenanthrothiazolium, and acenaphthothiazolium quaternary salts.

Exemplary of the basic heterocyclic nuclei are those satisfying Formulae III and IV.

$$\begin{array}{c} \overbrace{\phantom{xxx}Z^3\phantom{xxx}} \\ =C-(L\!=\!\!=\!\!L)_q-N-R \\ \updownarrow \\ \overbrace{\phantom{xxx}Z^3\phantom{xxx}} \\ -C\!=\!(L\!-\!\!-\!\!L)_q\!=\!N^+\!-R \end{array} \quad (III)$$

$$\begin{array}{c} \overbrace{\phantom{xxx}Q'\phantom{xxx}} \\ -C\!=\!L-(L\!=\!\!=\!\!L)_q-N-R \\ \updownarrow \\ \overbrace{\phantom{xxx}Q'\phantom{xxx}} \\ -C-L\!=\!(L\!-\!\!-\!\!L)_q\!=\!N^+\!-R \end{array} \quad (IV)$$

where
$Z^3$ represents the elements needed to complete a cyclic nucleus derived from basic heterocyclic nitrogen compounds such as oxazoline, oxazole, benzoxazole, the naphthoxazoles (e.g., naphth[2,1-d]oxazole, naphth[2,3-d]oxazole, and naphth[1,2-d]oxazole), oxadiazole, thiazoline, thiazole, benzothiazole, the naphthothiazoles (e.g., naphtho[2,1-d]thiazole), the thiazoloquinolines (e.g., thiazole[4,5-b]quinoline), phenanthrothiazole, acenaphthothiazole, thiadioxazole, selenazoline, selenazole, benzoselenazole, the naphthoselenazoles (e.g., naphtho[1,2-d]selenazole), benzotellurazole, naphthotellurazoles (e.g., naptho[1,2-d]tellurazole), imidazoline, imidazole, benzimidazole, the naphthimidazoles (e.g., naphth[2,3-d]imidazole), 2- or 4-pyridine, 2- or 4-quinoline, 1- or 3-isoquinoline, benzoquinoline, 3H-indole, 1H- or 3H-benzoindole, and pyrazole, which nuclei may be substituted on the ring by one or more of a wide variety of substituents such as hydroxy, the halogens (e.g., fluoro, chloro, bromo, and iodo), alkyl groups or substituted alkyl groups (e.g., methyl, ethyl, propyl, isopropyl, butyl, octyl, dodecyl, octadecyl, 2-hydroxyethyl, 3-sulfopropyl, carboxymethyl, 2-cyanoethyl, and trifluoromethyl), aryl groups or substituted aryl groups (e.g., phenyl, 1-naphthyl, 2-naphthyl, 4-sulfophenyl, 3-carboxyphenyl, and 4-biphenylyl), aralkyl groups (e.g., benzyl and phenethyl), alkoxy groups (e.g., methoxy, ethoxy, and isopropoxy), aryloxy groups (e.g., phenoxy and 1-naphthoxy), alkylthio groups (e.g., methylthio and ethylthio), arylthio groups (e.g., phenylthio, p-tolylthio, and 2-naphthylthio), methylenedioxy, cyano, 2-thienyl, styryl, amino or substituted amino groups (e.g., anilino, dimethylamino, diethylamino, and morpholino), acyl groups, (e.g., formyl, acetyl, benzoyl, and benzenesulfonyl);

Q′ represents the elements needed to complete a cyclic nucleus derived from basic heterocyclic nitrogen compounds such as pyrrole, indole, carbazole, benzindole, pyrazole, indazole, and pyrrolopyridine;

R represents alkyl groups, aryl groups, alkenyl groups, or aralkyl groups, with or without substituents, (e.g., carboxy, hydroxy, sulfo, alkoxy, sulfato, thiosulfato, phosphono, chloro, and bromo substituents);

L is in each occurrence independently selected to represent a substituted or unsubstituted methine group—e.g., $-CR^8=$ groups, where $R^8$ represents hydrogen when the methine group is unsubstituted and most commonly represents alkyl of from 1 to 4 carbon atoms or phenyl when the methine group is substituted; and q is 0 or 1.

Cyanine dyes can contain two heterocyclic nuclei of the type shown in Formula III joined by a methine linkage containing an uneven number of methine groups or can contain a heterocyclic nucleus according to each of Formulae III and IV joined by a methine linkage containing an even number of methine groups, where the methine groups can take the form $-CR^8=$ as described above. The greater the number of the methine groups linking nuclei in the polymethine dyes in general and the cyanine dyes in particular the longer the absorption wavelengths of the dyes. For example, dicarbocyanine dyes (cyanine dyes containing five methine groups linking two basic heterocyclic nuclei) exhibit longer absorption wavelengths than carbocyanine dyes (cyanine dyes containing three methine groups linking two basic heterocyclic nuclei) which in turn exhibit longer absorption wavelengths than simple cyanine dyes (cyanine dyes containing a single methine group linking two basic heterocyclic nuclei). Carbocyanine and dicarbocyanine dyes are longer wavelength dyes while simple cyanine dyes are typically yellow dyes, but can exhibit absorption maxima up to about 550 nm in wavelength with proper choice of nuclei and other components capable of bathochromically shifting absorption.

Preferred polymethine dyes, particularly cyanine dyes, for use as fluorescent dyes are so-called regidized dyes. These dyes are constructed to restrict the movement of one nucleus in relation to another. This avoids radiationless, kinetic dissipation of the excited state energy. One approach to rigidizing the dye structure is to incorporate a separate bridging group providing a separate linkage in addition to the methine chain linkage joining the terminal nuclei of the dye. Bridged polymethine dyes are illustrated by Brooker et al U.S. Pat. No. 2,478,367, Brooker U.S. Pat. No. 2,479,152, Gilbert U.S. Pat. No. 4,490,463, and Tredwell et al, "Picosecond Time Resolved Fluorescence Lifetimes of the Polymethine and Related Dyes", *Chemical Physics*, Vol. 43 (1979) pp. 307–316.

The methine chain joining polymethine dye nuclei can be rigidized by including the methine chain as part of a cyclic nucleus joining the terminal basic nuclei of the dye. One of the techniques for both rigidizing and bathochromically shifting the absorption maxima of polymethine dyes in general and cyanine dyes in particular is to include in the methine linkage an oxocarbon bridging nucleus. Exemplary oxocarbon bridging nuclei can take any of the forms indicatd by Formula V.

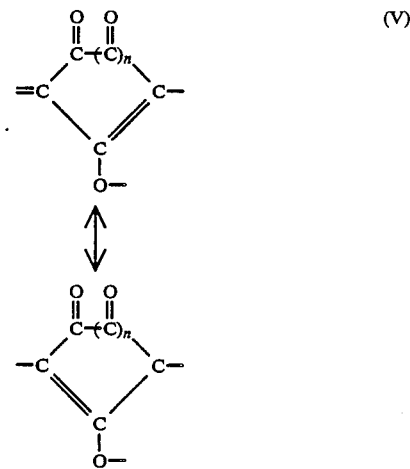
(V)

wherein n is the integer 0, 1, or 2.

Merocyanine dyes link one of the cyanine dye type basic heterocyclic nuclei described above to an acidic keto methylene nucleus through a methine linkage as described above, but containing zero, two, or a higher even number of methine groups. Zero methine dyes, those containing no methine groups in the linkage between nuclei, exhibit a double bond linkage between the nuclei in one resonance form and a single bound linkage in another resonance form. In either resonance form the linkage sites in the nuclei are formed by methine groups forming a part of each nucleus. Zero methine polymethine dyes are yellow dyes..

Exemplary acidic nuclei are those which satisfy Formula VI.

(VI)

where
G¹ represents an alkyl group or substituted alkyl group, an aryl or substituted aryl group, an aralkyl group, an alkoxy group, an aryloxy group, a hydroxy group, an amino group, or a substituted amino group, wherein exemplary substituents can take the various forms noted in connection with Formulae VI and VII;

G² can represent any one of the groups listed for G¹ and in addition can represent a cyano group, an alkyl, or arylsulfonyl group, or a group represented by

or G² taken together with G¹ can represent the elements needed to complete a cyclic acidic nucleus such as those derived from 2,4-oxazolkidinone (e.g., 3-ethyl-2,4-oxazolidindione), 2,4-thiazolidindione (e.g., 3-methyl-2,4-thiazolidindione), 2-thio-2,4-oxazolidindione (e.g., 3-phenyl-2-thio-2,4-oxazolidindione), rhodanine, such as 3-ethylrhodanine, 3-phenylrhodanine, 3-(3-dimethylaminopropyl)rhodanine, and 3-carboxymethylrhodanine, hydantoin (e.g., 1,3-diethylhydantoin and 3-ethyl-1-phenylhydantoin), 2-thiohydantoin (e.g., 1-ethyl-3-phenyl-2-thiohydantoin, 3-heptyl-1-phenyl-2-thiohydantoin, and arylsulfonyl-2-thiohydantoin), 2-pyrazolin-5-one, such as 3-methyl-1-phenyl-2-pyrazolin-5-one, 3-methyl-1-(4-carboxybutyl)-2-pyrazolin-5-one, and 3-methyl-2-(4-sulfophenyl)-2-pyrazolin-5-one, 2-isoxazolin-5-one, (e.g., 3-phenyl-2-isoxazolin-5-one), 3,5-pyrazolidindione (e.g., 1,2-diethyl-3,5-pyrazolidindione and 1,2-diphenyl-3,5-pyrazolidindione), 1,3-indandione, 1,3-dioxane-4,6-dione, 1,3-cyclohexanedione, barbituric acid (e.g., 1-ethylbarbituric acid and 1,3-diethylbarbituric acid), and 2-thiobarbituric acid (e.g., 1,3-diethyl-2-thiobarbituric acid and 1,3-bis(2-methoxyethyl)-2-thiobarbituric acid).

Useful hemicyanine dyes are essentially similar to the merocyanine dyes described above, differing only in substituting for the keto methylene group of Formula VI the group shown below in Formula VII.

(VII)

where
G³ and G⁴ may be the same or different and may represent alkyl, substituted alkyl, aryl, substituted aryl, or aralkyl, as illustrated for ring substituents in Formula VI or G³ and G⁴ taken together complete a ring system derived from a cyclic secondary amine, such as pyrrolidine, 3-pyrroline, piperidine, piperazine (e.g., 4-methylpiperazine and 4-phenylpiperazine), morpholine, 1,2,3,4-tetrahydroquinoline, decahydroquinoline, 3-azabicyclo[3,2,2]nonane, indoline, azetidine, and hexahydroazepine.

Useful hemioxonol dyes exhibit a keto methylene nucleus as shown in Formula VI and a nucleus as shown in Formula VII joined by a methine linkage as previously described containing one or a higher uneven number of methine groups.

Useful merostyryl dyes exhibit a keto methylene nucleus as shown in Formula VI and a nucleus as shown in Formula VIII joined by a methine linkage as described above containing one or a higher uneven number of methine groups.

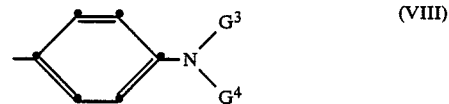

(VIII)

where
G³ and G⁴ are as previously defined.

The longer wavelength cyanine, merocyanine, hemicyanine, hemioxonol, and merostyryl dyes described above are intended to be illustrative of the simpler structural forms of useful longer wavelength polymethine dyes. It is generally recognized that substituents can join the nuclei and methine linkages to form additional cyclic structures. Further, the dyes can contain three or more nuclei. For example, by substituting a merocyanine dye in methine linkage with a second basic heterocyclic nucleus of the cyanine dye type an allopolar cyanine dye can be formed. Further, the various substituents not forming a part of the dye chromophore can be varied as desired to tailor dye physical properties, particularly hydrophobicity and hydrophillicity, to suit the particular film forming components employed. By choosing as the aliphatic moieties of the dyes hydrocarbon groups having more carbon atoms (e.g., from about 6 to 20 carbon atoms) the dyes can be rendered more oleophilic while hydrocarbon groups containing fewer numbers of carbon atoms (e.g., 1 to 5 carbon atoms) and particularly those bearing polar substituents render the dyes more hydrophilic. The aromatic moieties of the dyes typically contain from 6 to 10 carbon atoms.

The following are illustrative of polymethine dyes capable of maximum light absorption at shorter (<550 nm) wavelengths:

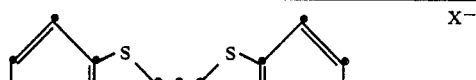

| | R | X⁻ |
|---|---|---|
| FD-32 | $-C_{16}H_{33}$ | $Cl^-$ |
| FD-33 | $-C_{18}H_{37}$ | $PTS^-$ |
| FD-34 | $-CH_2CH=CH_2$ | $Cl^-$ |

PTS = p-toluene sulfonate

FD-35

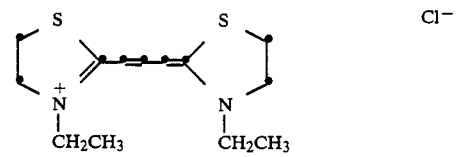

$Cl^-$

-continued
FD-36 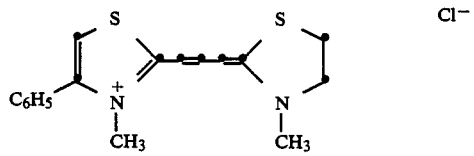 Cl⁻
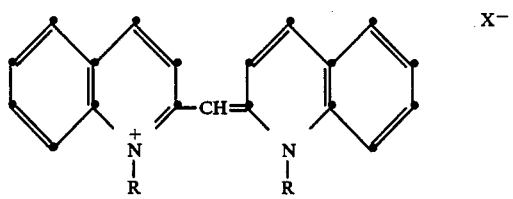 X⁻
| | R | X⁻ |
|---|---|---|
| FD-37 | —CH₂CH₃ | ClO₄⁻ |
| FD-38 | —C₄H₉ | ClO₄⁻ |
| FD-39 | —C₅H₁₁ | BF₄⁻ |
FD-40 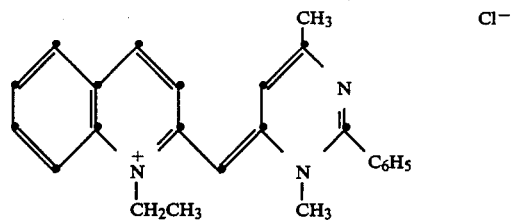 Cl⁻
FD-41 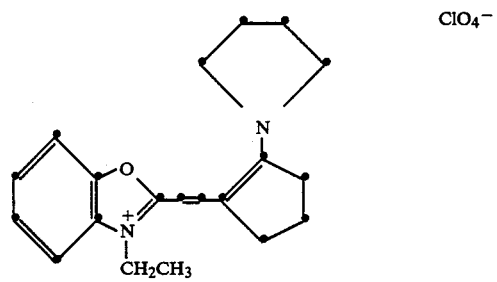 ClO₄⁻
FD-42 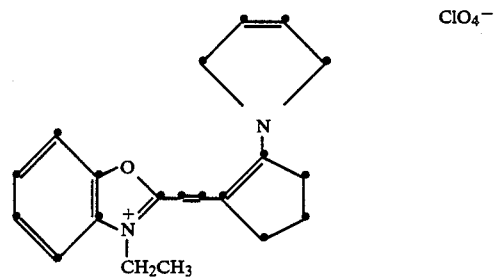 ClO₄⁻
FD-43 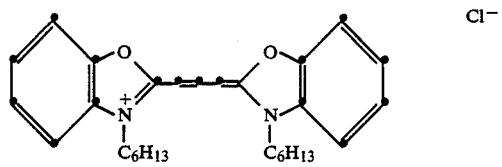 Cl⁻

-continued

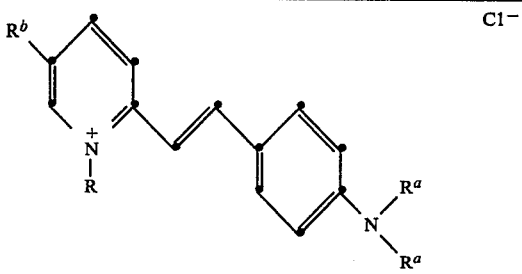

|       | $R^a$    | R      | $R^b$    |
|-------|----------|--------|----------|
| FD-44 | —CH₃     | —CH₃   | H        |
| FD-45 | —CH₃     | —CH₃   | —C₂H₃    |
| FD-46 | —C₃H₇    | —CH₃   | H        |

FD-47

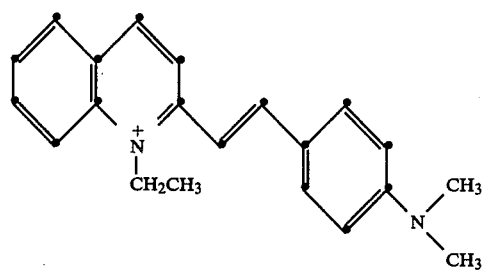

|       | n | R            | $R^c$    | $X^-$ |
|-------|---|--------------|----------|-------|
| FD-48 | 1 | —CH₃         | C₂H₅     | PTS⁻  |
| FD-49 | 1 | (CH₂)₃SO₃⁻   | C₅H₁₁    | —     |
| FD-50 | 1 | (CH₂)₄SO₃⁻   | C₅H₁₁    | —     |
| FD-51 | 2 | (CH₂)₅SO₃⁻   | C₂H₅     | —     |

FD-52  3,3'-Ethylenethiacyanine p-toluenesulfonate
FD-53  1',3-Ethylenethia-2'-cyanine chloride
FD-54  1,1'-Ethylene-2,2'-cyanine chloride
FD-55  3,3'-Ethyleneoxacyanine chloride
FD-56  1,1'-Diethyl-3,3'-Ethylenebenzimidazolocyanine p-toluenesulfonate
FD-57  1,1'-Diethyl-3,3'-methylenebenzimidazolocyanine chloride
FD-58  1,1'-Ethylenecyanine chloride
FD-59  1,1'-Methylenecyanine chloride
FD-60  5,5',6,6'-Tetrachloro-1,1'-diethyl-3,3'-ethanediylbenzimidazolocyanine chloride
FD-61  5,5',6,6'-Tetrachloro-1,1'-ethanediyl-3,3'-dimethylbenzimidazolocyanine chloride
FD-62  Anhydro-5,5',6,6'-tetrachloro-1,1'-ethan-diyl-3,3'-bis(3-sulfopropyl)-benzimidazolo-cyanine hydroxide, sodium salt
FD-63  2,2'-Methanediylbis-(5,6-dichloro-1-methylbenzimidazole
FD-64  5,5',6,6'-Tetrachloro-1,1'-dimethyl-3,3'-propanediylbenzimidazolocyanine p-toluenesulfonate
FD-65  5,5',6,6'-Tetrachloro-1,1'-dimethyl-3,3'-methanediylbenzimidazolocyanine p-toluenesulfonate
FD-66  5,5',6,6'-Tetrachloro-1,1'-ethanediyl-3,3'-bis(2,2,2-trifluoroethyl)benzimidazolocyanine p-toluenesulfonate
FD-67  5,5',6,6'-Tetrachloro-1,1'-ethanediyl-3,3',8-trimethylbenzimidazolocyanine p-toluenesulfonate Many polymethine dyes are capable of maximum light absorption at longer visible (>550 nm) wavelengths, with maximum fluorescence wavelengths generally lying in the red and near infrared portions of the spectrum. The following are illustrative of polymethine dyes capable of maximum light absorption at longer visible wavelengths:

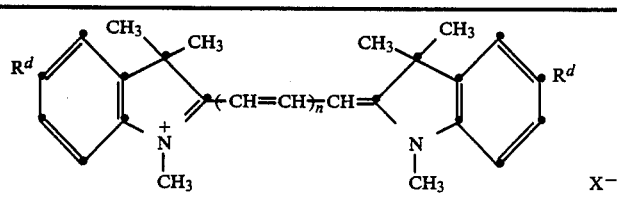
|       | n | $R^d$ | $X^-$ |
|-------|---|-------|-------|
| FD-68 | 1 | —     | $BF_4^-$ |
| FD-69 | 2 | —     | $PTS^-$ |
| FD-70 | 3 | —     | $BF_4^-$ |
| FD-71 | 3 | $-(CH=CH)_2-$ | $ClO_4^-$ |
FD-72
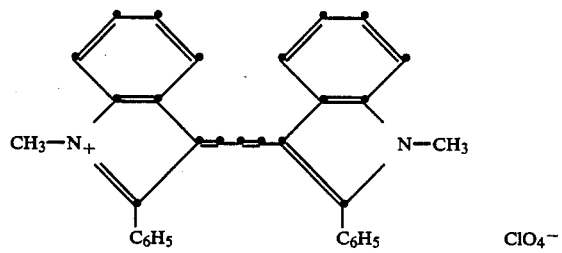
$ClO_4^-$
FD-73
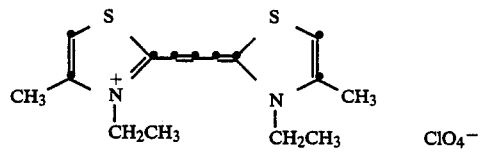
$ClO_4^-$
FD-74
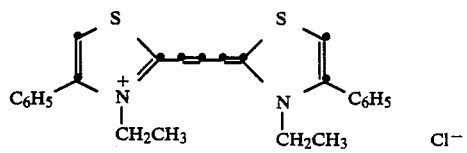
$Cl^-$
FD-75
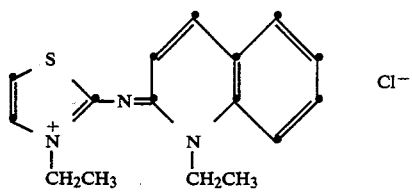
$Cl^-$
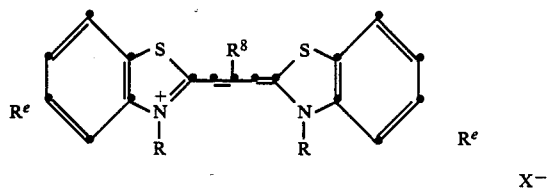
$X^-$
|       | R | $R^8$ | $R^e$ | $X^-$ |
|-------|---|-------|-------|-------|
| FD-76 | $-C_4H_9$ | $-H$ | — | $Cl^-$ |
| FD-77 | $-C_{18}H_{37}$ | $-H$ | — | $PTS^-$ |
| FD-78 | $-C_4H_9$ | $-CH_3$ | — | $Cl^-$ |
| FD-79 | $-C_5H_{11}$ | $-CH_3$ | — | $Cl^-$ |
| FD-80 | $-i-C_3H_7$ | $-CH_3$ | — | $Cl^-$ |
| FD-81 | $-C_3H_7$ | $-C_2H_5$ | — | $Cl^-$ |
| FD-82 | $-C_2H_5$ | $-C_2H_5$ | — | $C_3F_7COO^-$ |
| FD-83 | $-C_2H_5$ | $-C_6H_{11}$ (cyclohexyl) | $-(CH=CH)_2-$ | $Cl^-$ |
| FD-84 | $C_2H_5$ | $-C_{15}H_{31}$ | $-(CH=CH)_2-$ | $Cl^-$ |

-continued
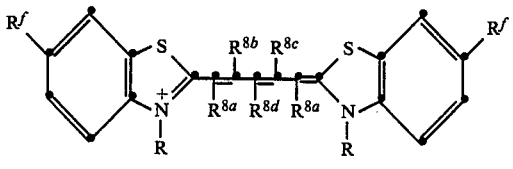
| | R | $R^{8a}$ | $R^{8b}$ | $R^{8c}$ | $R^{8d}$ | $R^f$ | $X^-$ |
|---|---|---|---|---|---|---|---|
| FD-85 | —CH$_2$CH$_3$ | H | H | H | H | H | Cl$^-$ |
| FD-86 | —CH$_2$CH$_3$ | H | H | H | H | —OCH$_3$ | PTS$^-$ |
| FD-87 | —CH$_2$CH$_3$ | H | H | H | —CH$_3$ | H | ClO$_4^-$ |
| FD-88 | —CH$_2$CH$_3$ | H | —CH$_2$—C(CH$_3$)$_2$—CH$_2$— | | H | H | ClO$_4^-$ |
| FD-89 | —CH$_2$CH$_2$CH$_2$— | | H | H | H | H | PTS$^-$ |
| FD-90 | —CH$_2$—CH$_2$— | | —CH$_2$—C(CH$_3$)$_2$—CH$_2$— | | H | H | PTS$^-$ |
FD-91
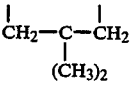
FD-92
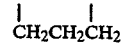
FD-93
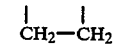
FD-94
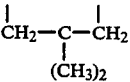
FD-95
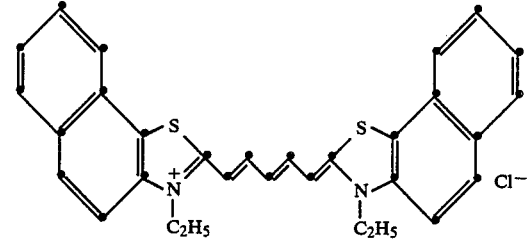

-continued
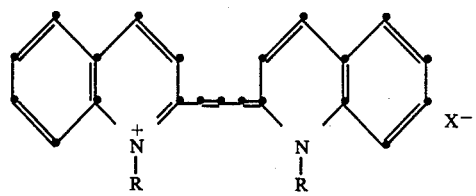
| | R | X⁻ |
|---|---|---|
| FD-96 | —CH$_2$CH$_2$C$_6$H$_5$ | BF$_4^-$ |
| FD-97 | —CH$_2$CH$_3$ | Cl⁻ |
FD-98
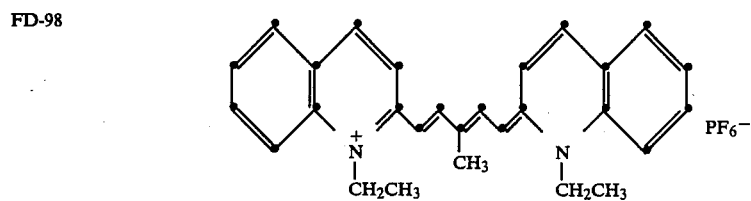
FD-99
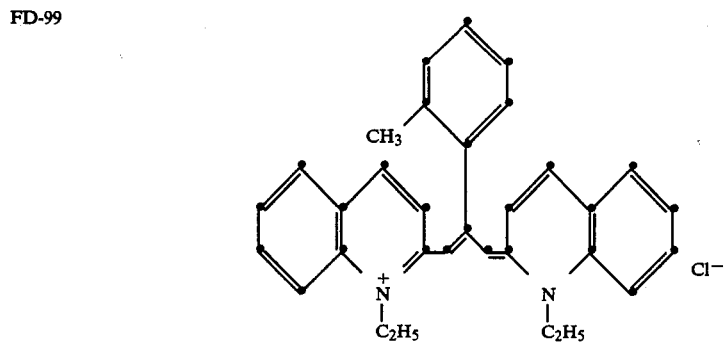
FD-100
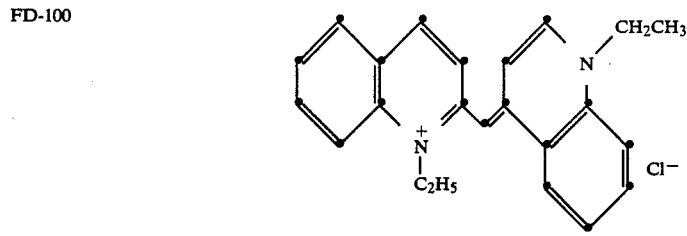
FD-101
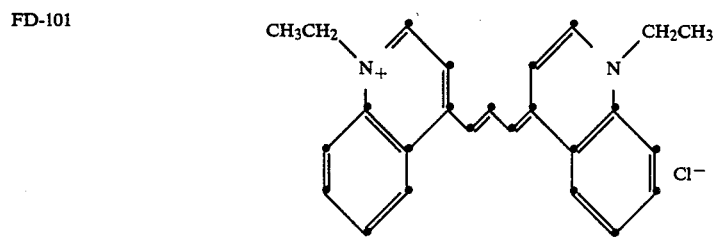
FD-102
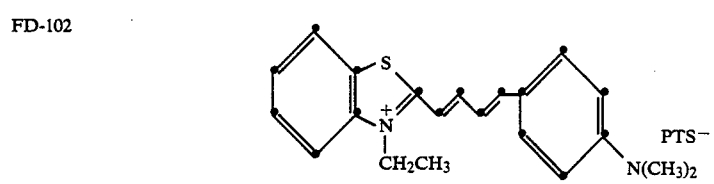

-continued
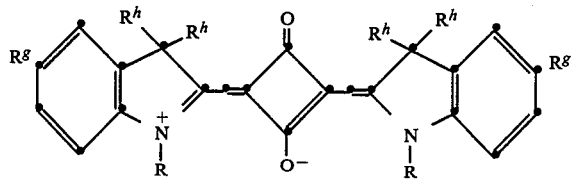
|        | $R^h$    | R        | $R^g$        |
|--------|----------|----------|--------------|
| FD-103 | —$CH_3$  | —$CH_3$  | —            |
| FD-104 | —$CH_3$  | —$CH_3$  | —$(CH=CH)_{\overline{2}}$ |
| FD-105 | —$CH_3$  | —$C_6H_5$ | —           |
| FD-106 | —$CH_3$  | 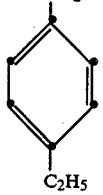 | — |
FD-107   2 adjacent $R^1 = -(CH_2)_{\overline{5}}$
         i.e., spirocyclohexyl
FD-108
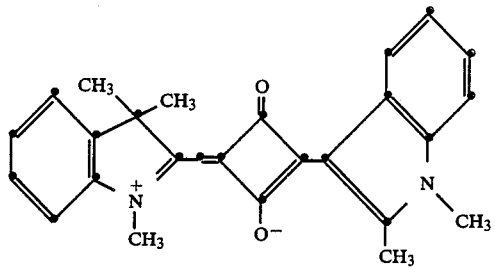
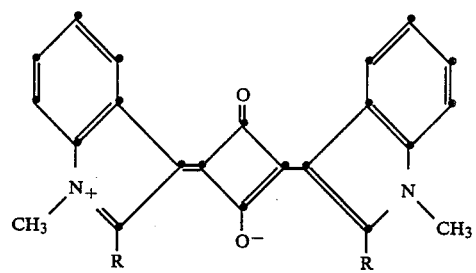
| FD-109 | R = $C_6H_5$ |
| FD-110 | R = —$C_{10}H_7$, i.e. α-naphthyl |
FD-111
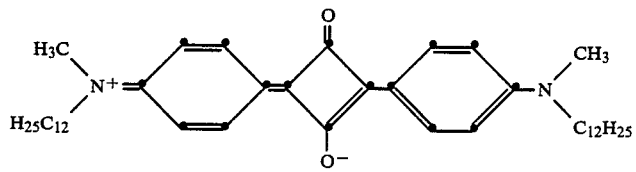
FD-112
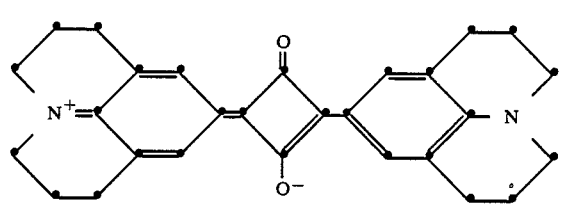

| | |
|---|---|
| FD-113 | 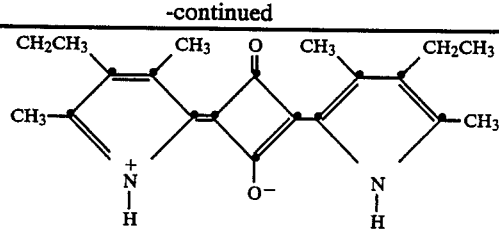 |

Another useful class of fluorescent dyes are 4-oxo-4H-benz-[d,e]anthracenes, hereinafter referred to as oxobenzanthracene dyes. Dyes of this class and their preparations are disclosed in Goswami et al U.S. Pat. No. 4,812,393. Preferred fluorescent oxobenzanthracene dyes are those represented by Formula IX:

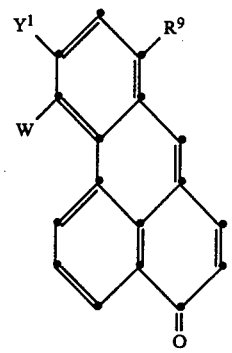

In this structure, $R^9$ is hydrogen, substituted or unsubstituted alkyl (preferably of 1 to 12 carbon atoms, e.g. methyl, ethyl, isopropyl, benzyl, phenethyl, etc.), substituted or unsubstituted hydroxyalkyl (preferably of 1 to 12 carbon atoms, e.g. hydroxymethyl, 2-hydroxyethyl, 2-hydroxyisopropyl, etc.), or substituted or unsubstituted alkoxycarbonyl (preferably of 2 to 12 carbon atoms, e.g. methoxycarbonyl, ethoxycarbonyl, n-propoxycarbonyl, etc.). Preferably, $R^9$ is hydrogen, substituted or unsubstituted alkyl or substituted or unsubstituted alkoxycarbonyl, and more preferably, it is substituted or unsubstituted alkoxycarbonyl.

W is hydrogen or an electron withdrawing group as that term is understood in the art (i.e. a group generally having a positive Hammett sigma value as determined by standard procedures). Particularly useful electron withdrawing groups include, but are not limted to, halo (e.g. fluoro, chloro, bromo), cyano, carboxy, acyl, substituted or unsubstituted arylsulfonyl (preferably of 6 to 10 carbon atoms, e.g. phenylsulfonyl, tolylsulfonyl, etc.), substituted or unsubstituted alkylsulfonyl (preferably of 1 to 6 carbon atoms, e.g. methylsulfonyl, ethylsulfonyl, etc.), substituted and unsubstituted dialkylphosphinyl (preferably where each alkyl group independently has 1 to 10 carbon atoms, e.g. methyl, ethyl, butyl, decyl, etc.) and substituted or unsubstituted dialkyl phosphono (preferably where each alkyl group independently has 1 to 10 carbon atoms as defined above). Preferably, W is hydrogen or halo.

$Y^1$ is hydrogen, or a group comprised of a heteroatom having a lone pair of electrons or a negative charge with an associated cation, e.g. hydroxy, mercapto or amino (—NR"R'"). R" and R'" are independently substituted or unsubstituted alkyl (preferably of 1 to 10 carbons, e.g., methyl, ethyl, decyl, etc.), substituted or unsubstituted aryl (preferably of 6 to 10 carbons, e.g., phenyl, naphthyl, etc.), or R" and R'", taken together, can represent the atoms necessary to complete a subsituted or unsubstituted heterocyclic ring (preferably of 5 to 10 carbon, nitrogen or oxygen atoms, e.g. a morpholino, pyrrolidinyl, pyridyl, piperidino, etc. ring). $Y^1$ can also be substituted or unsubstituted alkoxy (preferably of 1 to 10 carbon atoms, e.g. methoxy, ethoxy, 2-chloro-1-propoxy, etc.), substituted or unsubstituted carbamyloxy

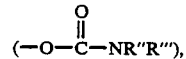

wherein R" and R'" are defined above, $-O^-M^+$ or $-S^-M^+$, wherein $M^+$ is a monovalent cation, e.g. $Na^+$, $K^+$, $Li^+$, $NH_4^+$, etc. Preferably $Y^1$ is hydroxy or $-O^-M^+$.

| | $R^9$ | W | $Y^1$ |
|---|---|---|---|
| FD-114 | Methyl | Hydrogen | Hydroxy |
| FD-115 | Methyl | Hydrogen | $-O^-Na^+$ |
| FD-116 | Methyl | Chloro | Hydroxy |
| FD-117 | Methyl | Chloro | $-O^-Na^+$ |
| FD-118 | Methyl | Chloro | N-methyl-N-phenylcarbamyloxy |
| FD-119 | Methyl | Hydrogen | Pyrrolidinyl |
| FD-120 | Butoxy-carbonyl | Hydrogen | Hydroxy |
| FD-121 | Butoxy-carbonyl | Hydrogen | $-O^-Na^+$ |
| FD-122 | Butoxy-carbonyl | Chloro | $-O^-Na^+$ |

The oxobenzanthracene dyes illustrated above can have one or more substituents other than those specifically illustrated in the structure as long as the substituents do not adversely affect the fluorescence of the compound, such as alkyl (e.g., alkyl of 1 to 5 carbon atoms), aryl (e.g., phenyl), and other groups.

The oxobenzanthracene dyes can be prepared generally using the following procedure. The general preparatory procedure includes: (1) preparation of a dihydrophenalenone by the procedure described by Cooke et al, Australian J. Chem., 11, pp. 230–235 (1958), (2) preparation of the lithium enolate of the dihydrophenalenone, (3) reaction of the lithium enolate with the appropriate phosphonium iodide reagent, and (4) reaction of this product with cupric chloride and lithium chloride to produce the chlorinated or unchlorinated dye.

Another useful class of fluorescent dyes are xanthene dyes. One particularly preferred class of xanthene dyes are rhodamine dyes. Preferred fluorescent rhodamine dyes are those represented by Formula X:

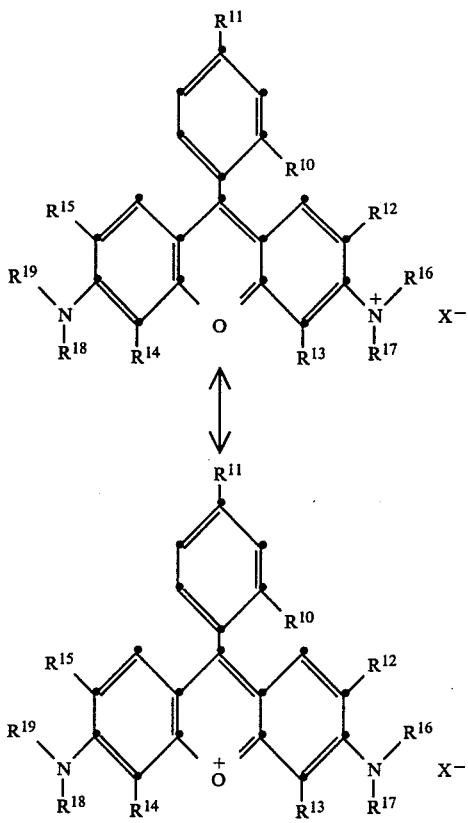

(X)

| | |
|---|---|
| FD-128 | o-[6-(Ethylamino)-3-(ethylimino)-2,7-dimethyl-3H-xanthenyl]benzoic acid |
| FD-129 | o-(6-Amino-3-imino-3H-xanthenyl)benzoic acid hydrochloride |
| FD-130 | o-[6-(Methylamino)-3-methylimino)-3H-xanthen-9-yl]benzoic acid perchlorate |
| FD-131 | Methyl o-(6-amino-3'-imino-3H-xanthen-9-yl)benzoate monohydrochloride |
| FD-132 | 8-(2,4-Disulfophenyl)-2,3,5,6,11,12,-14,15-1H,4H,10H,13H-otahydroquinolizin-ol[9,9a,1-bc;9,9a,1-hi]xanthylium hydroxide inner salt |
| FD-133 | Sulforhodamine B |
| FD-134 | o-[6-(Dimethylamino)-3-(dimethylamino)-3H-xanthen-9-yl]benzoic acid perchlorate |

Another specifically preferred class of xanthene dyes are fluorescein dyes. Preferred fluorescein dyes are those represented by Formula XI:

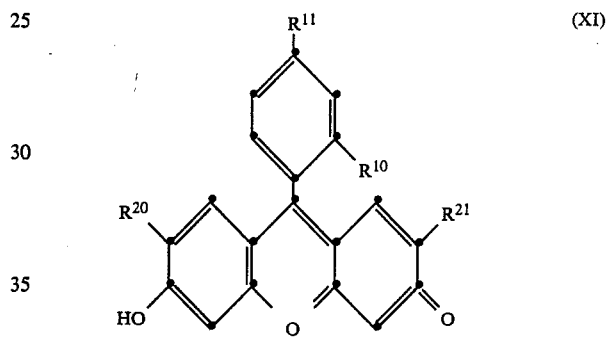

where $R^{10}$ and $R^{11}$ are as previously defined and $R^{20}$ and $R^{21}$ are hydrogen, alkyl, aryl, or halo substituents. Preferred alkyl groups contain from 1 to 5, optimally from 1 to 3 carbon atoms while phenyl is a preferred aryl group.

An illustrative fluorescein dye is where $R^{10}$ and $R^{11}$ are independently hydrogen, carboxyl, sulfonyl, alkanoyl, or alkoxycarbonyl groups;

$R^{12}$, $R^{13}$, $R^{14}$, and $R^{15}$ are hydrogen;

$R^{16}$, $R^{17}$, $R^{18}$, and $R^{19}$ are alkyl groups; and $X^-$ is an anion; or any one of or all of following substituent pairs: $R^{12}$ and $R^{16}$, $R^{13}$ and $R^{17}$, $R^{14}$ and $R^{18}$, and $R^{15}$ and $R^{19}$, complete a five or six membered ring containing nitrogen as the sole heteroatom.

The alkyl moieties in each instance contain from 1 to 5 carbon atoms, preferably 1 to 3 carbon atoms. When substituent pairs complete a fused ring, the ring can, for example, take the form of a pyran ring when a single fused ring including a formula nitrogen atom is formed or a julolidene ring (including a formula fused benzo ring) when two fused rings each including the same nitrogen atom of the formula are formed.

The following are illustrative of rhodamine dyes known to be useful laser dyes:

| | |
|---|---|
| FD-123 | [9-(o-Carboxyphenyl)-6-(diethylamino)-3H-xanthen-3-ylidene]diethyl ammonium chloride [a.k.a rhodamine B] |
| FD-124 | N-{6-[Diethylamino]-9-[2-(ethoxycarbonyl)-phenyl]-3H-xanthen-3-ylidene}-N-ethylethanaminium perchlorate |
| FD-125 | Ethyl o-[6-(Ethylamino)-3-(ethylimino)-2,7-dimethyl-3H-xanthenyl]benzoate chloride |
| FD-126 | Ethyl o-[6-(ethylamino)-3-(ethylimino)-2,7-dimethyl-3H-xanthenyl]benzoate perchlorate |
| FD-127 | Ethyl o-[6-(ethylamino)-3-(ethylimino)-2,7-dimethyl-3H-xanthenyl]benzoate tetrafluoroborate |

| | |
|---|---|
| FD-119 | 9-(o-Carboxyphenyl)-6-hydroxy-3H-xanthen-3-one |
| FD-120 | 9-(o-Carboxyphenyl)-2,7-dichloro-6-hydroxy-3H-xanthen-3-one |

Another useful group of fluorescent dyes are pyrylium, thiapyrylium, selenapyrylium, and telluropyrylium dyes. Dyes from the first three of these classes are disclosed by Light U.S. Pat. No. 3,615,414 while dyes of the latter class are disclosed by Detty U.S. Pat. No. 4,584,258, the disclosures of which are here incorporated by reference. Since the latter two classes of dyes are bathochromically shifted toward the infrared the former two classes of dyes are preferred for achieving visible light emissions.

Illustrative preferred fluorescent pyrylium and thiapyrylium dyes are represented by Formula XII:

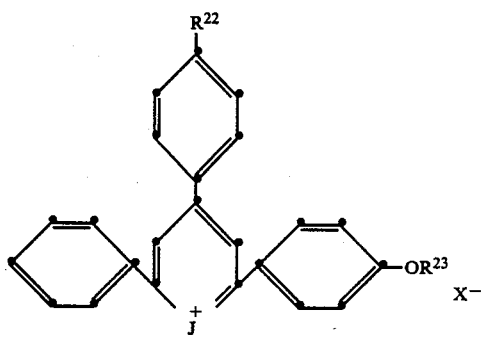

(XII)

where
R²² is hydrogen, methyl, or a tertiary amino group, optimally a —NR²³R²³ group;
R²³ is an alkyl group;
X⁻ is an anion; and
J is oxygen or sulfur.

The alkyl group preferably contains from 1 to 5 carbon atoms and optimally from 1 to 3 carbon atoms. Illustrative pyrylium and thiapyrylium fluorescent dyes satisfying formula XV are the following:

| | |
|---|---|
| FD-135 | 4-(4-dimethylaminophenyl)-2-(4-methoxyphenyl)-6-phenylpyrylium perchlorate |
| FD-136 | 4,6-diphenyl-2-(4-ethoxyphenyl)thiapyrylium p-toluenesulfonate |
| FD-137 | 2-(4-methoxyphenyl)-6-phenyl-4-(p-tolyl)-pyrylium tetrafluoroborate |

Another useful class of fluorescent dyes are fluorescent carbostyril dyes. These dyes are characterized by a 2-quinolinol or isoquinolinol ring structure, often fused with other rings. The wavelengths of maximum fluorescence generally increases with the presence of other fused rings. Typical of simple carbostyril dyes, which fluoresce in the blue portion of the spectrum, are the following:

| | |
|---|---|
| FD-138 | 7-Amino-4-methyl-2-quinolinol [a.k.a. 7-amino-4-methylcarbostyril] |
| FD-139 | 7-Dimethylamino-2-hydroxy-4-methylquinoline [a.k.a. 7-dimethylamino-4-methylcarbostyryl] |
| FD-140 | 3,3'-Bis[N-phenylisoquinoline] |

Examples are more complex fused ring carbostyril dyes are provided by Kadhim and Peters, "New Intermediates and Dyes for Synthetic Polymer Fibres Substituted Benzimidazolothioxanthenoisoquinolines for Polyester Fibres", JSDC, Jun. 1974, pp. 199-201, and Arient et al, "Imidazole Dyes XX-Colouring Properties of 1,2-Napthooxylenebenzimidazole Derivatives", JSDC, Jun. 1968, pp. 246-251. Illustrative of these more complex carbostyril dyes are the following:

| | |
|---|---|
| FD-141 | Benzimidazo[1,2-b]thioxantheno[2,1,9,-d,e,f]isoquinolin-7-one and its stereo isomer Benzimidazo[1,2-a]thioxantheno-[2,1,9,d,e,f]isoquinolin-7-one |

Among other fused ring fluorescent dyes the perylene dyes, characterized by a dinaphthylene nucleus. A variety of useful fluorescent perylene dyes are known, such as, for example those disclosed by Rademacher et al, "Soluble Perylene Fluorescent Dyes with Photostability", Chem. Ber., Vol. 115, pp. 2927-2934, 1982, and European Patent Application 553,363Al, published Jul. 7, 1982. One preferred perylene dye is illustrated by Formula XIII:

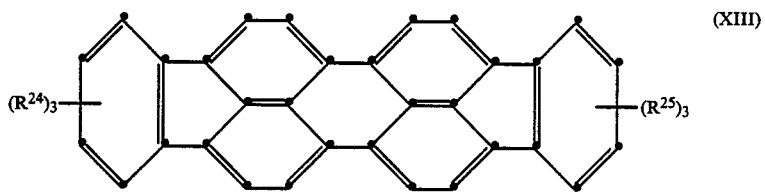

(XIII)

where
R²⁴ and R²⁵ are independently selected from the group consisting of alkyl, halo, and haloalkyl substituents. Preferred alkyl groups having from 1 to 5 carbon atoms, optimally from 1 to 3 carbon atoms.

Another preferred groups of perylene dyes are the 3,4,9,10-perylenebis(dicarboximides), hereinafter referred to a perylenebis(dicarboximide) dyes. Preferred dyes of this class are represented by Formula XIV:

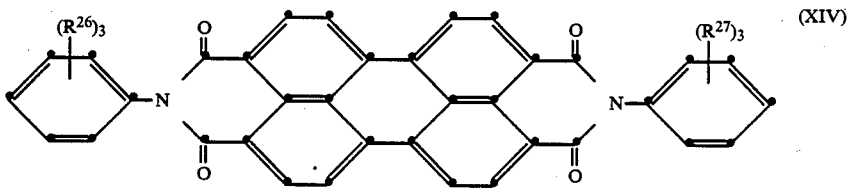

(XIV)

where
R²⁶ and R²⁷ are independently selected from the group consisting of alkyl, halo, and haloalkyl substituents. Preferred alkyl groups having from 1 to 5 carbon atoms, optimally from 1 to 3 carbon atoms.

Illustrative of preferred perylene dyes are the following:

| | |
|---|---|
| FD-142 | Perylene |
| FD-143 | 1,2-Bis(5,6-o-phenylenenaphthalene) |

| | -continued |
|---|---|
| FD-144 | N,N'-diphenyl-3,4,9,10-perylenebis(dicarboximide) |
| FD-145 | N,N'-di(p-tolyl)-3,4,9,10-perylenebis(dicarboximide) |
| FD-146 | N,N'-di(2,6-di-t-butyl) 3,4,9,10-perylenebis(dicarboximide) |

The foregoing listing of preferred fluorescent dyes useful in combination with the host materials, though lengthy, is recognized to be only exemplary of known fluorescent dyes, both in the classes specifically identified and in still other dye classes. For example, many other classes of known fluorescent dyes, such as acridine dyes; bis(styryl)benzene dyes; pryrene dyes; oxazine dyes; and phenyleneoxide dyes, sometimes referred to as POPOP dyes; are useful, specific illustrative dyes from these classes including the following:

| FD-147 | 9-Aminoacridine hydrochloride |
|---|---|
| FD-148 | p-Bis(o-methylstyryl)benzene |
| FD-149 | 2,2'-p-Phenylenebis(4-methyl-5-phenyloxazole) |
| FD-150 | 5,9-Diaminobenzo[a]phenoxazonium perchlorate |
| FD-151 | 5-Amino-9-diethylaminobenz[a]phenoxazonium perchlorate |
| FD-152 | 3,7-Bis(diethylamino)phenoxazonium perchlorate |
| FD-153 | 3,7-Bis(ethylamino)-2,8-dimethylphenoxazin-5-ium perchlorate |
| FD-154 | 9-Ethylamino-5-ethylimino-10-methyl-5H-benzo[a]phenoxazonium perchlorate |
| FD-155 | 8-Hydroxy-1,3,6-pyrene-trisulfonic acid trisodium salt |

Not only are there many available classes of fluorescent dyes to choose from, there are wide choices of individual dye properties within any given class. The absorption maxima and reduction potentials of individual dyes can be varied through the choice of substituents. As the conjugation forming the chromophore of the dye is increased the absorption maximum of a dye can be shifted bathochromically.

Emission maxima are bathochromic to the absorption maxima. Although the degree of bathochromic shifting can vary as a function of the dye class, usually the wavelength of maximum emission is from 25 to 125 nm bathochromically shifted as compared to the wavelength of maximum absorption. Thus, dyes which exhibit absorption maxima in the near ultraviolet in almost all cases exhibit maximum emissions in the blue portion of the spectrum. Dyes which exhibit absorption maxima in the blue portion of the spectrum exhibit emission maxima in the green portion of the spectrum, and, similarly, dyes with absorption maxima in the red portion of the spectra tend to exhibit emission maxima in the near infrared portion of the spectrum.

EXAMPLE 1

Solutions were prepared from Coumarin 314 and Coumarin 314T. Each was dissolved in EtOH at a concentration of $5 \times 10^{-3}$M to create reference solutions; in addition, two solutions of each dye were prepared in water with heptakis (2,6-di-O-methyl)-$\beta$-cyclodextrin. In the absence of cyclodextrin, neither dye will dissolve in water to any measurable extent. For each dye, the two cyclodextrin concentrations were $4.5 \times 10^{-2}$M and $9.0 \times 10^{-2}$M; each solution was saturated with its respective dye and each solution was filtered. Absorption spectra were run in 1 mm cells and laser output was measured using an excimer laser pumped dye laser as described in Chen et al, Applied Optics, Vol. 27, No. 3., p. 443, Feb. 1, 1988. Results are set forth in the following two tables:

TABLE 1

| | Solution Composition | | Cyclodextrin |
|---|---|---|---|
| Solution No. | Dye | Solvent | Conc'n (in Moles) |
| 20-1 | C-314 | EtOH | — |
| 20-2 | C-314 | H$_2$O | $4.5 \times 10^2$ |
| 20-3 | C-314 | H$_2$O | $9.0 \times 10^{-2}$ |
| 20-4 | C-314T | EtOH | — |
| 20-5 | C-314T | H$_2$O | $4.5 \times 10^{-2}$ |
| 20-6 | C-314T | H$_2$O | $9.0 \times 10^{-2}$ |

TABLE 2

| Absorption Measurements and Laser Output | | | | |
|---|---|---|---|---|
| Solution No. | $\lambda_{max}$ (nm) | A$_{max}$ | A$_{308\ nm}$ | Laser Output (Relative Units of Energy) |
| 20-1 | 433.8 | 2.776 | .077 | 21 |
| 20-2 | 449.8 | 1.936 | .101 | 10 |
| 20-3 | 445.0 | 2.988 | .158 | 5 |
| 20-4 | 431.8 | 2.443 | .0345 | 25 |
| 20-5 | 438.6 | 1.515 | .074 | 8 |
| 20-6 | 438.4 | 2.295 | .109 | 4 |

Coumarin 314 and 314T have the following structural formulas wherein Me and Et signify methyl, —CH$_3$, and ethyl, —C$_2$H$_5$, respectively.

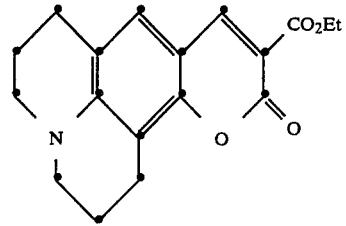

Coumarin 314

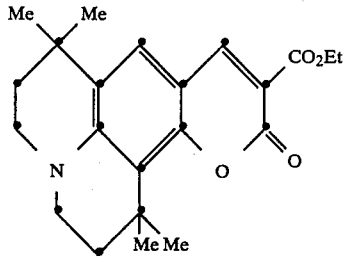

Coumarin 314T

EXAMPLE 2

Two experiments were conducted showing that higher concentrations of substituted cyclodextrin lead to more efficient dye lasing. In both experiments, Rhodamine 6G in ethanol was used as the standard. The substituted cyclodextrin was heptakis 2,6-di-O-methyl)-$\beta$-clodextrin. The Rhodamine 6G concentration for all solutions was 4 mM.

The experiments were conducted as generally described in the previous example. Results are reported in the following Table:

TABLE 3

| Solvent | Heptakis (2,6-di-O-methyl)-β-cyclodextrin (M) | $\lambda_{max}$ (nm) | $E_{out}$ (μJ) | Tuning Range (nm) |
|---|---|---|---|---|
| EtOH | — | 578 | 22.5 | 556–615 |
| H$_2$O | $9.3 \times 10^{-3}$ | 604 | 0.78 | 597–602 |
| H$_2$O | $3.4 \times 10^{-2}$ | 602 | 2.91 | 586–614 |
| EtOH | — | 578 | 22.7 | 554–608 |
| H$_2$O | $6.9 \times 10^{-1}$ | 598 | 3.73 | 583–613 |
| H$_2$O | $1.74 \times 10^{-1}$ | 595 | 9.91 | 577–614 |
| H$_2$O | $3.85 \times 10^{-1}$ | 588 | 11.34 | 575–611 |

EXAMPLE 3

Data in the following two tables show the improvement in relative fluorescence yields for aqueous solutions of dye inclusion compounds made from substituted β-cyclodextrins, relative to inclusion compounds prepared from unsubstituted β-cyclodextrin:

TABLE 4

Relative Fluorescence Yields of Three Laser Dyes Included with Various Substituted β-Cyclodextrins Relative to Inclusion with β-Cyclodextrin

| | Fluorescence Yields Relative to β-Cyclodextrin | | |
|---|---|---|---|
| Cyclodextrin | DASPI | Rhodamine 6G | 9-Aminoacridine Hychochloride 1-Hydrate |
| β-cyclodextrin | 1.00 | 1.00 | 1.00 |
| heptakis (2,6-di-O-methyl)-β-cyclodextrin | 1.30 | 1.52 | 1.45 |
| hydroxypropyl-β-cyclodextrin (MS = 0.6) | 1.55 | | |
| hydroxypropyl-β-cyclodextrin (MS = 0.9) | 1.83 | 1.52 | 1.23 |
| hydroxyethyl-β-cyclodextrin (MS = 0.6) | 1.20 | | |
| hydroxyethyl-β-cyclodextrin (MS = 1.0) | 1.42 | | |
| hydroxyethyl-β-cyclodextrin (MS = 1.6) | 1.51 | | |
| methyl-β-cyclodextrin (DS = 1.8) | 1.20 | | |

In the table above, MS=molar substitution, which means the number of indicated groups per anhydroglucose unit in the β-cyclodextrin ring.

TABLE 5

Fluorescence Yields of Various Dyes Included in Heptakis (2,6-di-O-methyl)-β-Cyclodextrin Relative to Inclusion in β-Cyclodextrin*

| Dye | Relative Yields |
|---|---|
| 9-Aminoacridine Hydrochloride, 1-Hydrate | 1.45 |
| Carbostyril 165 | 1.15 |
| Coumarin 6 | 1.33 |
| DCM | 11.0 |
| DODC Iodide | 1.13 |
| Oxazine 1 | 1.20 |
| POPOP | 2.02 |
| DASPI | 1.30 |
| Rhodamine 6G | 1.52 |
| Stilbene 420 | 1.10 |

*With two exceptions, relative yields are based on equal absorption intensities in β-cyclodextrin and the substituted β-cyclodextrin. The two exceptions are DCM and POPOP for which the listed relative yields are enhanced by greater water solubility in the presence of heptakis (2,6-di-O-methyl)-β-cyclo-dextrin.

Dyes used in the above table have the following structural formulas wherein Me and Et have the significance used above:

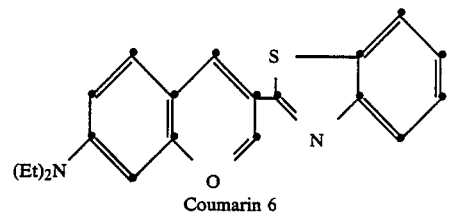

Coumarin 6

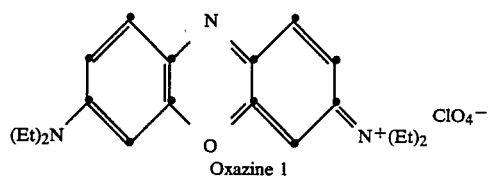

Oxazine 1

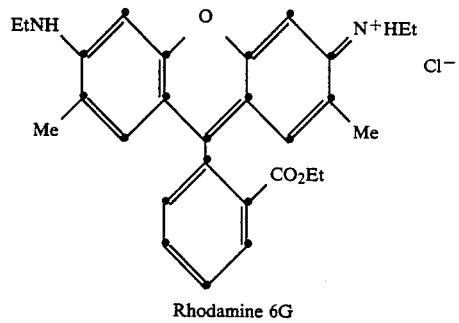

Rhodamine 6G

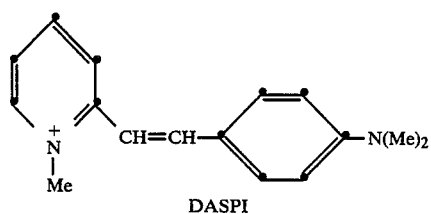
DASPI

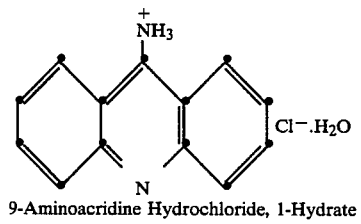
9-Aminoacridine Hydrochloride, 1-Hydrate

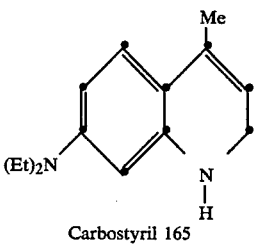
Carbostyril 165

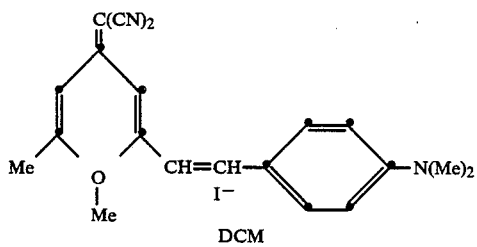
DCM

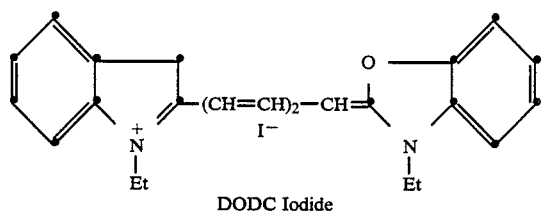
DODC Iodide

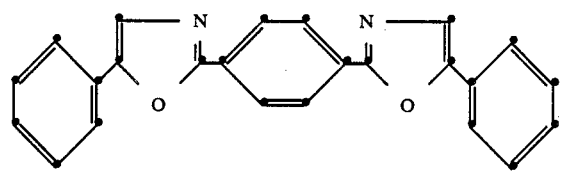
POPOP

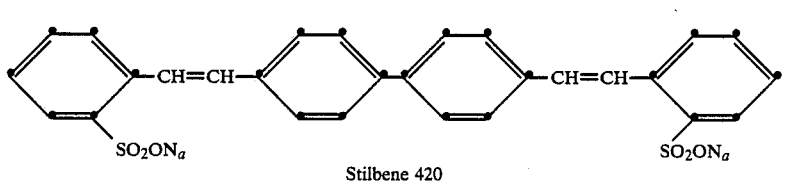
Stilbene 420

Additional results were obtained with a polymeric beta cyclodextrin purchased from American Tokyo Kasei in Portland, Ore. The supplier describes the polymer as being soluble in water at least to the extent of 5 grams per 100 mL, and having an average molecular weight of 5300. For the experiments reported in the table which follows, the concentration of dye in the samples tested was $1 \times 10^{-5}$, and the concentration of cyclodextrin was 0.20M. The polymeric cyclodextrin was composed of beta cyclodextrin rings bridged with groups having the formula $CH_2$—CHOH—$CH_2$—.

Two other β-cyclodextrin polymers were purchased from FDS Publications in England and were supplied originally by Chinoin Pharmaceutical and Chemical Works in Budapest, Hungary. These two polymers are cross-linked by epichlorohydrin; one of them was further reacted to add two carboxymethyl substituents per cyclodextrin ring. In Table 6, the three polymers are designated #1, #2, and #3 as follows:

Poly-β-cyclodextrin #1 from American Tokyo Kasei
Poly-β-cyclodextrin #2 from Chinoin
Poly-β-cyclodextrin #3 (with carboxymethyl substituents) from Chinoin.

Polymer #2 has a weight average molecular weight of 4500.

Applicant compared the absorption and fluorescence yield of DASPI in ethanol, DASPI and β-cyclodextrin in water, and DASPI and poly-β-cyclodextrin (Polymers 1, 2, and 3 in Table 6) in water. In each instance, the dye concentration was $5 \times 10^{-6}$ molar. The concentration of the β-cyclodextrin was 0.016 molar, and the concentration of each polymeric cyclodextrin was 0.020 molar, based on the molecular weight of the cyclodextrin unit.

Assigning the fluorescence yield of the aqueous β-cyclodextrin system the value of 1.0, the fluorescence yield of the ethanol system was 1.5. Surprisingly, with DASPI the fluorescence yield of each polymer was, as shown by the Table 6, markedly greater than the fluorescence yield of the dye in ethanol, and also much greater than the yield for the non-polymeric cyclodextrin.

This level of fluorescence yield increase for an aqueous system comprising a polymeric, substituted cyclodextrin is apparently unknown in the art. This discovery comprises a highly preferred embodiment of this invention.

TABLE 6
Relative Fluorescence Levels in Water Measured With β-Cyclodextrin, Trimethyl-β-Cyclodextrin, and Water-Soluble β-Cyclodextrin Polymers

|  | Dyes | |
| --- | --- | --- |
|  | Rhodamine 6G | DASPI |
| β-cyclodextrin | 1.0 | 1.0 |
| Heptakis (2,3,6-tri-O-methyl)-β-CD | 0.9 | 0.6 |
| Poly β-cyclodextrin #1 | 0.9 | 3.9 |
| Poly β-cyclodextrin #2 | 0.9 | 4.2 |
| Poly β-cyclodextrin #3 | 0.9 | 5.1 |

Similar results are obtained when the polymer employed in the Examples reported in Table 6 are replaced with other polymers having α or β cyclodextrin rings bridged by groups having the formula $CHR^1$—CHOH—$CHR^1$, wherein $R^1$ is selected from hydrogen and alkyl groups having up to six carbon atoms, such that the number of cyclodextrin rings so bridged is from two to about six.

The invention has been described above in detail with particular reference to preferred embodiments. A skilled practitioner, familiar with the above-detailed description, can make many modifications and substitutions without departing from the spirit and cope of the appended claims.

I claim:

1. As a composition of matter, a cyclodextrin inclusion compound of a fluorescent dye and an α- or β-chclodextrin having a substituent bonded to an oxygen atom in a glucose unit in said cyclodextrin, said substituent being selected from the class consisting of:
   (a) alkyl radicals having 1 to 6 carbon atoms,
   (b) radicals having the formula —$(CH-CHR^1-O)_{\overline{n}}H$ wherein $R^1$ is selected from hydrogen and alkyl radicals having up to about six carbon atoms, and n is equal to a small whole number up to six, and
   (c) radicals having the formula —$CHR^1$—CHOH—$CHR^1$— wherein $R^1$ has the same definition as above, such that said radicals bridge two cyclodextrin rings, and the number of said rings so bridged per molecule is from two to about six;
   said substituted cyclodextrin having not more than two substituents per glucose unit.

2. A composition according to claim 1 wherein said cyclodextrin is a β-cyclodextrin.

3. A composition according to claim 2 wherein said substituent is an alkyl radical having 1 to six carbon atoms.

4. A composition according to claim 3 wherein the average number of alkyl radicals per glucose unit is in the range of from about one to about two.

5. A composition of claim 4 wherein said alkyl radical is a methyl group.

6. A composition according to claim 2 wherein the cyclodextrin has a substituent selected from radicals having said formula

$+CH-CHR^1-O)_{\overline{n}}H$.

7. A composition according to claim 6 wherein the average number of substituents per glucose unit is in the range of from 1 to about 2.0.

8. A composition according to claim 7 wherein said substituent is 2-hydroxypropyl.

9. A composition according to claim 7 wherein said substituent is hydroxyethyl.

10. A composition according to claim 2 wherein said substituent has the formula —$CNR^1$—CHON—$CHR^1$, bridging two cyclodextrin rings, and the average number of rings so bridged per molecule of substituted cyclodextrin is from two to about six.

11. An aqueous dye solution for use in a dye laser, said solution comprising water, an inclusion compound of claim 1, and an excess of said substituted cyclodextrin such that there is about 1,000 times more non-dye combined cyclodextrin than inclusion compound.

12. A dye solution of claim 11 wherein the dye concentration is about $1 \times 10^{-5}$M, and the concentration of the cyclodextrin is about 0.02M.

13. A dye solution of claim 12 wherein said substituent on said substituted cyclodextrin is a radical having the formula —$CHR^1$—CHOH—$CNR^1$—.

* * * * *